(12) United States Patent
Guyon

(10) Patent No.: US 11,479,110 B2
(45) Date of Patent: Oct. 25, 2022

(54) VENTILATION DEVICE FOR A MOTOR VEHICLE AND MOUNTING METHOD

(71) Applicant: Flex-N-Gate France, Audincourt (FR)

(72) Inventor: Cyrille Guyon, Nommay (FR)

(73) Assignee: Flex-N-Gate France, Audincourt (FR)

( * ) Notice: Subject to any disclaimer, the term of this patent is extended or adjusted under 35 U.S.C. 154(b) by 101 days.

(21) Appl. No.: 16/843,688

(22) Filed: Apr. 8, 2020

(65) Prior Publication Data
US 2020/0324642 A1 Oct. 15, 2020

(30) Foreign Application Priority Data
Apr. 9, 2019 (FR) ...................................... 19 03780

(51) Int. Cl.
*B60K 11/00* (2006.01)
*B60K 11/08* (2006.01)
*B62D 65/16* (2006.01)

(52) U.S. Cl.
CPC ............ *B60K 11/085* (2013.01); *B62D 65/16* (2013.01)

(58) Field of Classification Search
CPC ........ B60K 11/04; B60K 11/085; B60D 65/16
See application file for complete search history.

(56) References Cited

U.S. PATENT DOCUMENTS

| | | | | |
|---|---|---|---|---|
| 3,500,739 A | * | 3/1970 | Dry .......................... | F24F 13/15 454/318 |
| 8,444,215 B2 | * | 5/2013 | Bernt .................... | B60K 11/085 296/193.1 |
| 9,162,641 B2 | * | 10/2015 | Townson ............. | B62D 25/084 |
| 9,447,719 B2 | * | 9/2016 | Kiener ..................... | F28F 27/02 |
| 10,040,344 B2 | * | 8/2018 | Schoning ................ | B60R 19/48 |
| 10,093,173 B1 | * | 10/2018 | Frayer .................. | B60K 11/085 |
| 2010/0127533 A1 | * | 5/2010 | Gonin ..................... | B60R 19/18 296/193.09 |
| 2012/0110909 A1 | * | 5/2012 | Crane ................. | B29C 48/0021 49/70 |

(Continued)

FOREIGN PATENT DOCUMENTS

| | | |
|---|---|---|
| DE | 102009058760 A1 | 6/2011 |
| DE | 102011004169 A1 | 8/2012 |

(Continued)

OTHER PUBLICATIONS

French Search Report corresponding to French Application No. FR 1903780, dated Dec. 9, 2019, 2 pages.

*Primary Examiner* — Hau V Phan
(74) *Attorney, Agent, or Firm* — Reising Ethington P.C.

(57) ABSTRACT

A ventilation device for a motor vehicle includes a frame defining an opening for an air flow, and at least one flap mounted so as to rotate relative to the frame about a pivot axis between an open position, suitable for allowing the air flow to pass, and a closed position, suitable for reducing the intensity of the air flow or changing its direction. The flap extends along the pivot axis and has a first end and a second end that are opposite one another along this axis and mounted so as to rotate on the frame around the pivot axis. The ventilation device further includes an intermediate support located between the first end and the second end along the pivot axis. The flap is mounted so as to rotate on the intermediate support relative to the frame about the pivot axis, the intermediate support being attached on the frame.

8 Claims, 3 Drawing Sheets

(56) References Cited

U.S. PATENT DOCUMENTS

2016/0236563 A1 8/2016 Ruppert et al.
2017/0326971 A1* 11/2017 Cosmo ................. B60K 11/085
2017/0361699 A1* 12/2017 Wiech ................... B60K 11/04

FOREIGN PATENT DOCUMENTS

| DE | 102014106605 A1 | 11/2015 |
|----|-----------------|---------|
| DE | 102017105568 A1 | 9/2018  |
| EP | 3272565 A1      | 1/2018  |
| GB | 2332657 A       | 6/1999  |

* cited by examiner

VENTILATION DEVICE FOR A MOTOR VEHICLE AND MOUNTING METHOD

TECHNICAL FIELD

The present invention relates to a ventilation device for a motor vehicle, the ventilation device comprising:
- a frame defining an opening for an air flow having an intensity and a direction relative to the frame, and
- at least one flap mounted for rotating relative to the frame about a pivot axis between an open position, suitable for allowing the air flow to pass, and a closed position, suitable for reducing the intensity of the air flow or changing its direction, the flap extending along the pivot axis and having a first end and a second end that are opposite one another along the pivot axis.

The invention also relates to a mounting method for this device.

BACKGROUND

Such a ventilation device is intended to manage air flows of a motor vehicle. The device is for example used to manage the temperature of the engine of the motor vehicle, or to manage the aerodynamics of the vehicle.

The device is for example arranged at the front of the vehicle and is advantageously part of the grille of the vehicle. The ventilation device allows the management of an incoming air flow intended to be in contact with the cooling system of the engine and to make it possible to keep the engine at an optimal running temperature. Such a ventilation device is most often hidden behind a grate or grille.

The ventilation device generally comprises a plurality of flaps kept parallel to one another by an appropriate actuating system.

The flaps are generally made from a thermoplastic material having a limited stiffness. This in practice limits the maximum possible length of the flaps between their two ends along their respective pivot axes. Beyond a length greater than 350 mm, there is a risk of twisting of the flaps or significant deformations under the effect of the air flow.

In order to make frames having a greater extension along one of the pivot axes of the flaps, the frame incorporates a fixed bar arranged in the center along the pivot axis. The flaps are mounted rotating on either side of the fixed central bar. In this configuration, the central bar is an integral part of the frame. The flaps are conventionally snapped on the frame and on the central bar.

Such a solution makes the assembly of the flaps fairly lengthy, and does not truly make it possible to implement large flaps. Indeed, the flaps are mounted in the extension of one another in pairs, but their individual length, that is to say, the distance between the central bar and the frame, remains limited. Furthermore, such flaps, when they are visible, are sometimes considered not to be esthetically pleasing.

SUMMARY

One aim of the invention is to address this drawback, by proposing a ventilation device making it possible to implement flaps with a greater extension.

To that end, the invention relates to a ventilation device of the type described above, in which:
- each of the first end and the second end is mounted for rotating on the frame about the pivot axis; and
- the ventilation device further comprises an intermediate support located between the first end and the second end along the pivot axis, the flap being mounted for rotating on the intermediate support relative to the frame about the pivot axis, the intermediate support being attached on the frame.

According to specific embodiments, the ventilation device comprises one or more of the following features, considered alone or according to any technically possible combinations:
- the intermediate support couples two portions of the frame along a transverse axis substantially perpendicular to the pivot axis, the two portions being separated by the opening along the transverse axis, the intermediate support preferably being screwed or snapped on each of two portions of the frame;
- a plurality of flaps mounted rotating on the frame respectively about pivot axes between an open position, suitable for allowing the air flow to pass, and a closed position, suitable for reducing the intensity of the air flow or changing its direction, the flaps forming a screen suitable for hiding the intermediate support for an observer located on the other side of the screen relative to the intermediate support along an axis substantially perpendicular to the opening;
- the first end of said flap forms one of a first pin and a first housing, and the frame forms the other of a first pin and a first housing, the first pin being located in the first housing in order to form a first pivot about the first pivot axis between the flap and the frame, the first pin and the first housing being configured to nest one in the other along the pivot axis during a step for assembling the ventilation device;
- the second end forms one of a second pin and a second housing, the frame forming the other of a second pin and a second housing, the second pin being located in the second housing in order to form at least part of a second pivot about the pivot axis between the flap and the frame;
- the first housing completely surrounds the first pin about the pivot axis;
- the second housing is configured to receive the second pin during a step for assembling the ventilation device after the first pin has been inserted in the first housing, the second pin being received in the second housing along an axis substantially perpendicular to the pivot axis, the ventilation device preferably comprising at least one holding part attached on the frame in order to keep the second pin in the second housing along said axis;
- a body extending from the first end to the second end along the pivot axis, and a fastening portion secured to the body and forming a third pin and a third housing, the intermediate support forming the other of a third pin and a third housing, the third pin being located in the third housing to form a third pivot about the pivot axis between the flap and the intermediate support, the third pin and the third housing being configured to nest one in the other along the pivot axis during a step for assembling the flap on the intermediate support;
- the third housing completely surrounds the third pin about the pivot axis; and
- the fastening portion forms one of a fourth pin and a fourth housing, the intermediate support forming the other of a fourth pin and a fourth housing, the fourth pin being located in the fourth housing in order to form a fourth pivot about the pivot axis between the flap and the intermediate support, the fourth pin being configured to snap in the fourth housing along an axis substantially perpendicular to the pivot axis.

The invention also relates to a method for mounting a ventilation device as described above, comprising:
mounting the rotary flap on the intermediate support,
mounting the first end of the flap on the frame,
mounting the second end of the flap on the frame, and
fastening the intermediate support on the frame.

BRIEF DESCRIPTION OF THE DRAWINGS

The invention will be better understood upon reading the following description, provided solely as an example, and done in reference to the appended drawings, in which.

DETAILED DESCRIPTION

Figure 1:
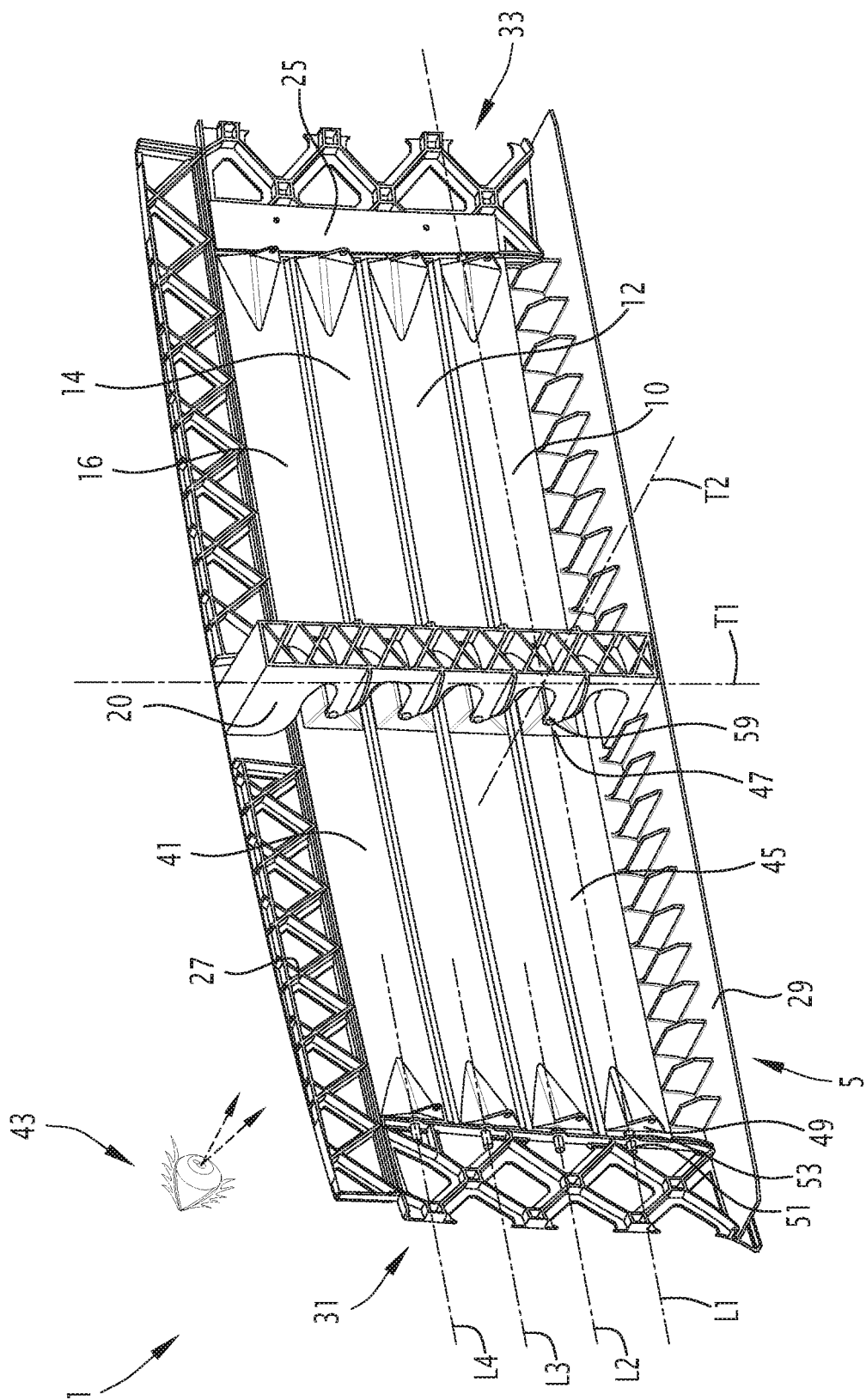
FIG. 1 is a perspective view, from the downstream side as defined by the air flow, of a ventilation device according to an embodiment of the invention.
Figure 2:
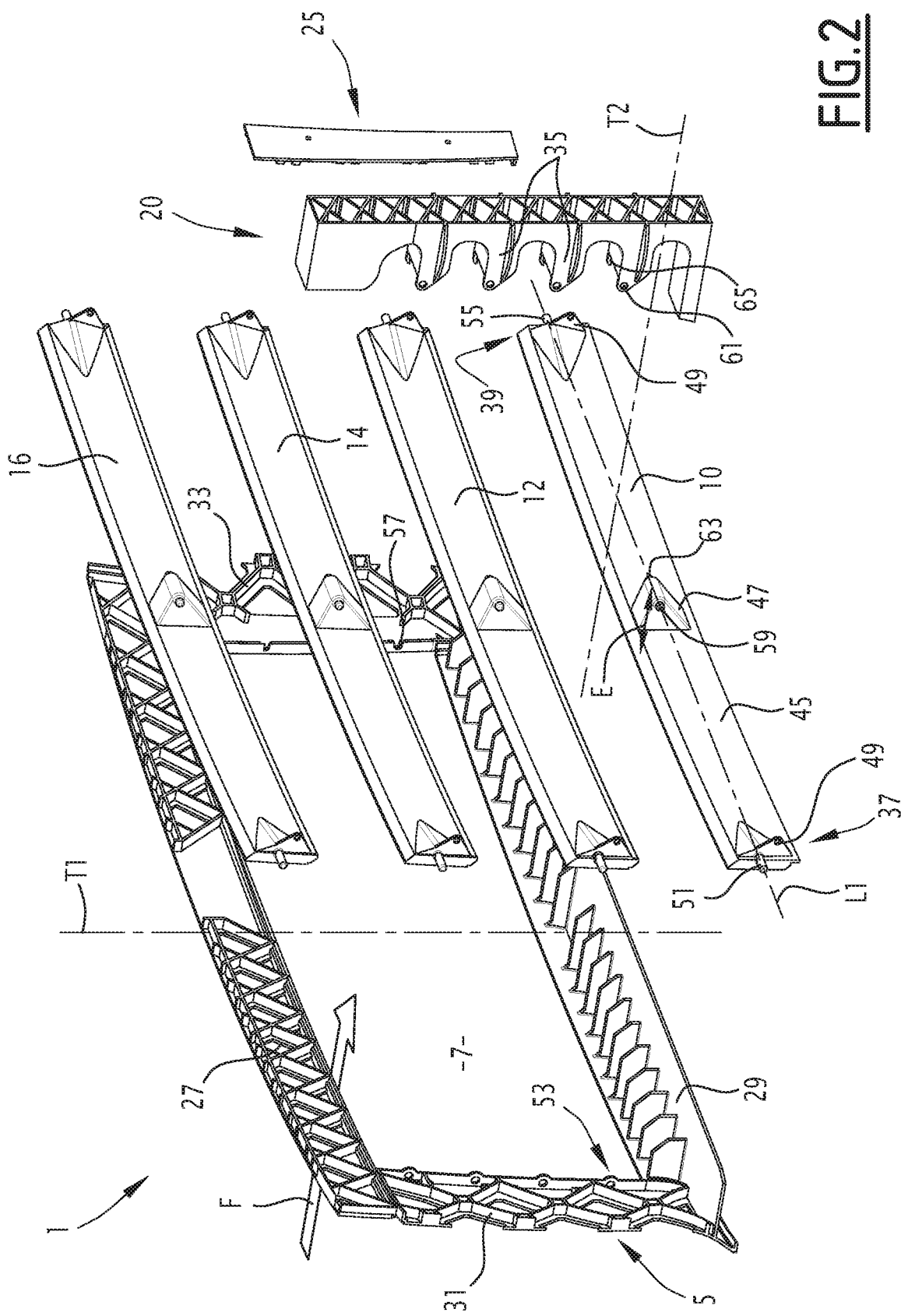
FIG. 2 is an exploded perspective view of the ventilation device shown in FIG. 1.
Figure 3:
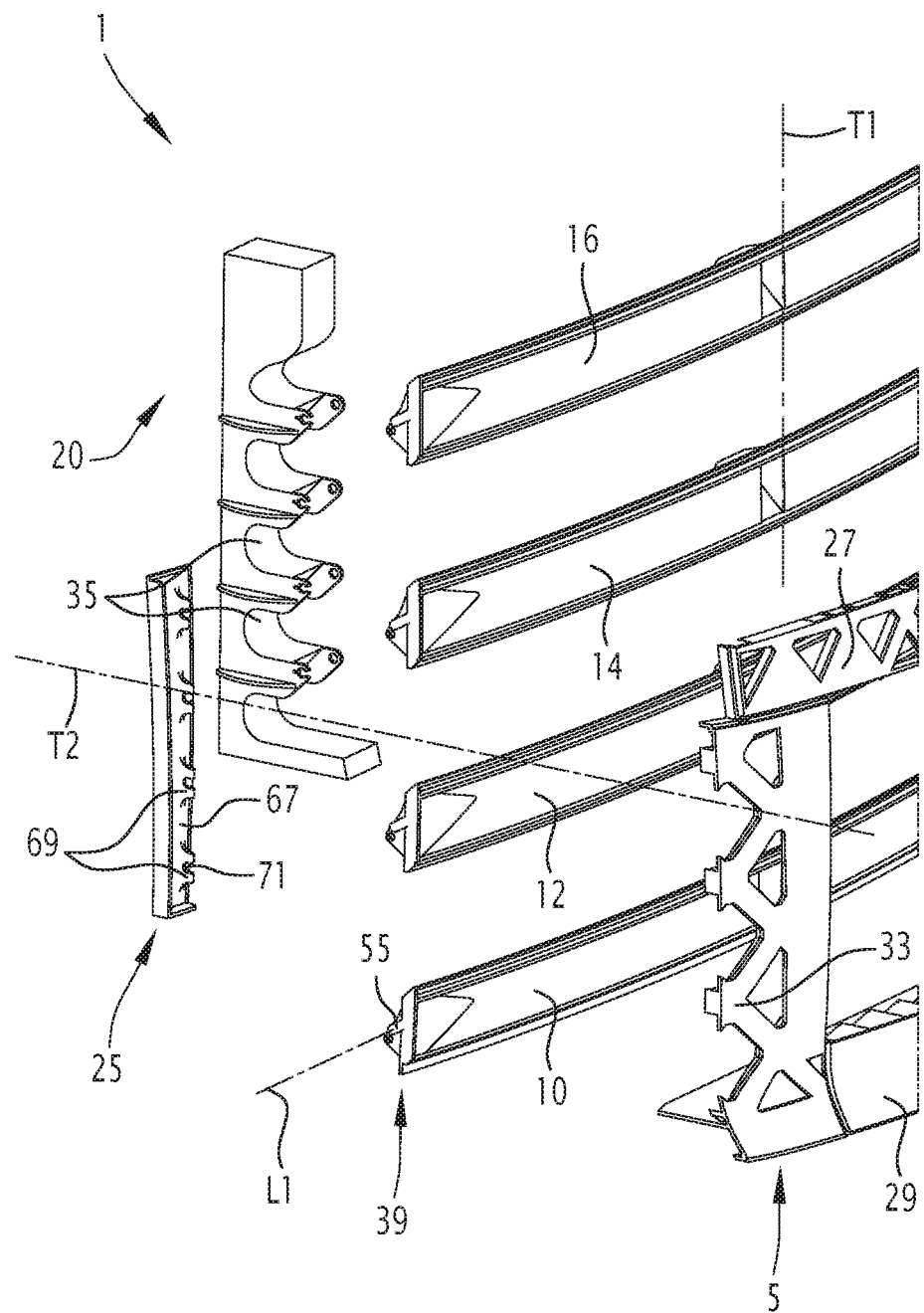
FIG. 3 is a partial exploded perspective view of the ventilation device shown in FIGS. 1 and 2, the device being seen from the upstream side.

The ventilation device 1 according to an embodiment of the invention is described in reference to FIGS. 1 to 3.

The ventilation device 1 is for example intended to be part of a grille, a front technical face or a bumper of a motor vehicle to allow an air flow F in (FIG. 2) from the outside of the motor vehicle toward the inside.

The ventilation device 1 comprises a frame 5 defining an opening 7 for the air flow F, a plurality of flaps 10, 12, 14, 16 mounted for rotating on the frame respectively about pivot axes L1, L2, L3, L4 between a closed position (shown in FIG. 1), suitable for reducing the intensity of the air flow F or changing its direction, and an open position (not shown, but able to be deduced from the closed position by a rotation of the flaps about their pivot axes), suitable for allowing the air flow to pass.

The ventilation device 1 also comprises an intermediate support 20 attached on the frame 5, and extending along a transverse axis T1, for example perpendicular to the pivot axis L1.

Advantageously, the ventilation device further comprises a holding part 25 attached on the frame 5 in order to keep the flaps 10 to 16 against the frame.

An axis T2 is also defined substantially perpendicular to the pivot axis L1 and the transverse axis T1. The axis T2 is therefore substantially perpendicular to the opening 7.

The axis T2 is for example substantially parallel to a front-back axis of the motor vehicle (not shown).

The pivot axis L1 is for example substantially parallel to the axles (not shown) of the motor vehicle.

The transverse axis T1 is therefore, in the illustrated example, substantially vertical.

According to a variant that is not shown, the axis T1 forms a certain angle with the vertical and is no longer perpendicular to the axis T2.

According to one embodiment, in the closed position, the intensity of the air flow F is substantially nil, that is to say, the closed position is a completely closed off position.

The frame 5, the flaps 10 to 16, the intermediate support 20 and any holding part 25 are advantageously made from a polymer material using any appropriate industrial means, for example by injection into appropriate molds (not shown).

According to another specific embodiment, the frame 5 is formed by a grille of the motor vehicle.

In the illustrated example, the opening 7 is substantially rectangular.

According to variants that are not shown, the opening 7 can have other shapes, in particular oblong or elliptical.

The frame 5 comprises two portions 27 and 29 respectively forming, in the illustrated example, an upper beam and a lower beam that are substantially parallel to the pivot axis L1. The frame 5 also comprises two portions 31 and 33 forming, in the illustrated example, two uprights whose general shape is substantially parallel to the transverse axis T1.

The portions 27, 29, 31, 33 delimit the opening 7.

The intermediate support 20 is manufactured separately from the frame 5 (it is a separate part from the frame).

The intermediate support 20 for example forms a bar.

In a variant, more complex shapes are possible.

According to a variant that is not shown, the intermediate support 20 is part of another part of the vehicle, for example a front technical face.

The intermediate support advantageously couples the portions 27, 29 of the frame 5 along the transverse axis T1. The intermediate support 20 is for example screwed or snapped respectively on these portions.

The intermediate support 20 advantageously includes protuberances 35 respectively extending toward the flaps 10 to 16 along the axis T2 and on which the flaps are mounted respectively rotating about pivot axes L1 to L4.

The intermediate support 20 is located between a first end 37 and a second end 39 of the flap 10 along the pivot axis L1. Advantageously, the intermediate support 20 is located substantially at an equal distance from these ends along the pivot axis L1.

The flaps 10 to 16 form a closing system of the opening 7.

In the illustrated example, the pivot axes L1 to L4 are substantially parallel to one another, and the flaps 10 to 16 are mounted on the portions 31, 33 of the frame 5, successively along the transverse axis T1, advantageously evenly spaced apart along this axis.

The flaps 10 to 16 advantageously form a screen 41 (FIG. 1) in the closed position, suitable for hiding the intermediate support 20 from a viewer 43 located on the other side of the screen relative to the intermediate support along the axis T2.

Advantageously, the flaps 10 to 16 are structurally similar to one another, and are fastened on the frame 5 and the intermediate support 20 similarly. Therefore, only the flap 10 will be described in detail hereinafter.

The flap 10 for example comprises a body 45 extending from the first end 37 to the second end 39 along the pivot axis L1, and a fastening portion 47 located between the first end and the second end, advantageously substantially equidistant from the two.

The flap 10 also advantageously includes protruding fasteners 49, for example respectively located at the first end 37 and the second end 39, and intended to make it possible to actuate the flap about the pivot axis L1.

According to one specific embodiment, it is possible to consider making at least one of the flaps 10 to 16 stationary, in order to allow the installation, for example, of a license plate or a LIDAR. This flap is for example made stationary by adding an additional fastening point on at least one of the ends 37 and 39, or by misaligning its fastening points such that the rotation about the pivot axis is no longer possible. In this case, the ventilation device 1 for example includes one or several moving flaps (similar to the flaps 10 to 16), and one or several stationary flaps.

The body 45 for example forms a ribbon advantageously bowed around the transverse axis T1 in the closed position. This bowed shape is reflected by the existence of a deflection E of the ribbon relative to the pivot axis L1 along the axis T2. In other words, the first end 37 and the second end 39 are located at the pivot axis L1, while the center of the body 45 is separated from the pivot axis L1 by a distance E along the axis T2.

The first end 37 forms a first pin 51. The first pin 51 is located in a first housing 53 defined by the portion 31 of the frame 5. The first pin 51 and the first housing 53 form a first pivot of the flap 10 about the pivot axis L1. The first pin 51 and the first housing 53 are configured to nest one in the other along the pivot axis L1 during a step for mounting the ventilation device 1, which will be described later.

The first pin 51 for example has a cylindrical shape oriented toward the pivot axis L1.

The first housing 53 is for example a single orifice that advantageously completely surrounds the first pin 51 about the pivot axis L1.

According to a variant that is not shown, the first end 37 of the flap 10 forms a housing and the portion 31 of the frame 5 forms a pin so as to make the first pivot.

The second end 39 forms a second pin 55. The second pin 55 is located in a second housing 57 formed in part by the portion 33 of the frame 5 and by the holding part 25. The second pin 55 and the second housing 57 form a second pivot about the pivot axis L1 between the flap 10 and the frame 5. The second housing 57 is configured to receive the second pin 55 during a step for assembling the ventilation device 1 after the first pin 51 has been inserted in the first housing 53, the second pin being received along an axis substantially perpendicular to the pivot axis L1, for example along the axis T2. According to a variant not shown, the second end 39 forms a housing and the frame 5 forms a pin received in said housing in order to form the second pivot.

The second housing 57 is for example formed by a notch in the frame 5.

The fastening portion 47 for example has a wedge shape. The fastening portion 47 is mounted on the intermediate support 20, for example so as to produce a strict pivot link about the pivot axis L1, optionally with the possibility of a slight translation of the flap 10 relative to the intermediate support 20 along the pivot axis L1.

The fastening portion 47 forms a third pin 59. The third pin 47 is located in a third housing 61 defined by one of the protuberances 35 of the intermediate support 20 so as to form a third pivot about the pivot axis L1 between the flap 10 and the intermediate support 20. The third pin 59 and the third housing 61 are configured to nest one in the other along the pivot axis L1 during a step for mounting the flap 10 on the intermediate support 20.

The third housing 61 is for example an orifice advantageously completely surrounding the third pin 59 about the pivot axis L1.

According to a variant that is not shown, the fastening portion 47 forms a housing and the intermediate support 20 forms a pin suitable for cooperating with this housing in order to form the third pivot.

The fastening portion 47 further forms a fourth pin 63. The fourth pin 63 is located in a fourth housing 65 defined by said protuberance 35 of the intermediate support 20 to form a fourth pivot about the pivot axis L1 between the flap 10 and the intermediate support. The fourth pin 63 is for example configured to snap in the fourth housing 65 along an axis substantially perpendicular to the pivot axis L1, for example the axis T2.

According to a variant that is not shown, the fastening portion 47 forms a housing and the intermediate support 20 forms a pin located in the housing to form the fourth pivot.

Because the fastening portion 47 forming the third pin 59 and the fourth pin 63 is taken between the third housing 61 and the fourth housing 65, the flap 20 is not free in rotation relative to the intermediate support 20 except about the pivot axis L1.

The first pin 51, the second pin 55, the third pin 59 and the fourth pin 63 are substantially aligned along the pivot axis L1.

The holding part 25 is suitable for keeping the second pin 55 in the housing 57. The part 25 for example comprises a main portion 67 extending along the transverse axis T1, and protuberances 69 oriented along the axis T2 from the main part.

According to a variant that is not shown, the second pin 55 is snapped in the second housing 57, and the holding part 25 is not used.

According to another variant that is not shown, the holding part is replaced by a system with several parts, each used to hold one of the flaps.

Each of the protuberances 69 forms a housing 71 suitable for being pressed against the third pin 55 of the flaps 10 to 16 so as to push the latter into the third housing 57.

The holding part 25 is for example screwed or snapped on the frame 5, advantageously on the portion 33.

A method for mounting the ventilation device 1 will now be described.

Initially, the component parts of the ventilation device 1 are separated from one another, for example as shown in FIG. 2.

The flaps 10 to 16 are first mounted on the intermediate support 20.

For each of the flaps, the fastening part 47 is mounted on one of the protuberances 35. To that end, the third pin 59 is inserted into the third housing 61 along the pivot axis L1. Then, the fourth pin 63 is snapped in the fourth housing 65.

At the end of these operations, the flap 10 is mounted pivoting on the intermediate support 20, owing to the third and fourth pivots.

The same procedure is followed for the other flaps 12, 14, 16, which thus assume their relative positions with respect to the intermediate support 20. This allows easy movement of the assembly formed by the intermediate support 20 and the plurality of flaps.

Next, the flaps 10 to 16 are mounted on the frame 5. For each of the flaps, the first pin 51 is introduced into the first housing 53 respectively along the pivot axes L1, L2, L2, L4.

Next, the second pin 55 is introduced into the second housing 57 along the axis T2, for each of the flaps 10 to 16.

The intermediate support 20 is fastened on the frame 5 by screwing or snapping.

The holding part 25 is also fastened on the frame 5 in order to hold the second pins 55 in the second housings 57.

During operation, it is understood that the flaps 10 to 16 are held solidly on the frame 5 and on the intermediate support 20.

On the side of the first end 37, the first pin 51, after mounting, cannot be separated from the first housing 53 along the directions perpendicular to the pivot axis L1. The only degree of freedom allowed for the flap 10 is a rotation about the pivot axis L1 relative to the frame 5, and optionally a slight translation along the pivot axis L1.

Likewise, the third pin 59 pivots in the third housing 61 about the pivot axis L1, but cannot be separated from the pivot axis L1 along the directions perpendicular to the pivot axis.

Lastly, on the side of the second end 39, owing to the holding part 25, the second pin 55 pivots in the second housing 57, but cannot leave this housing along the directions perpendicular to the pivot axis L1.

Owing to the features described above, it is possible to fasten flaps with a great extension along their pivot axis, typically greater than or equal to 350 mm or even 400 mm, without risk of twisting of the flaps about the pivot axes, or more generally deformation of the flaps that would be detrimental to the running of the ventilation device.

Furthermore, owing to the optional features according to which the first housing 53 and the third housing 61 respectively completely surround the first pin 51 and the third pin 59, the flap 10 cannot be respectively uncoupled from the frame 5 and the intermediate support 20 by any pressure from a user on this flap perpendicular to the pivot axis L1. The flaps 10 to 16 are therefore held solidly by the frame 5 and the intermediate support 20.

Owing to the optional holding part 25, the second pin 55 is also solidly held in the second housing 57.

Advantageously, the intermediate support 20 makes it possible to collectively move the plurality of flaps 10 to 16 during the mounting. The pivot link that advantageously exists between each of the flaps 10 to 16 and the intermediate support makes it possible to give the flaps their orientation relative to the intermediate support 20.

Furthermore, the intermediate support 20 is easily hidden by the screen 41 formed by the flaps 10 to 16 in the closed position for the viewer 43.

The main advantages of the ventilation device 1 are:
- a reduced demountability of the system without tools, that is to say, increased security in particular when the flaps 10 to 16 are visible,
- increased stiffness for the flaps 10 to 16 of large size owing to the intermediate support 20,
- the invisibility of the intermediate support 20 when the flaps are in the closed position,
- easy mounting in the plant,
- robustness during use due to the difficulty of disassembling the device, the stiffness of the flaps and the reliability of the assembly,
- reduced functional play relative to a complete snap mounting,
- better cohesion between the flaps 10 to 16 and the frame 5, and
- the possibility of making one or more flaps stationary in order to incorporate a license plate, for example.

Furthermore, the intermediate support 20 can be manufactured separately from the frame 5, which makes it possible to make the frame and the flap optionally more complex without detriment to the feasibility of the parts.

The intermediate support 20 can be formed by another part of the vehicle, for example a technical front face or a reinforcing part of a bumper.

The intermediate support 20 advantageously connects the portions 27, 29 of the frame 5 and allows a transfer of any vertical forces. Furthermore, the intermediate support 20 can be sized to absorb the impacts of the "parking" or "pedestrian" type or be fusible.

The use of a removable intermediate support forming a bar makes it possible to size it very closely without detriment to its feasibility. It may comprise weak areas with planned breaking (fusible zone) to achieve the predefined stiffness objectives.

The assembly of the flaps to the first end 37 and the second end 39 is very robust owing to more easily controllable play.

Owing to the intermediate support, the flaps are furthermore esthetically pleasing when they are visible by the viewer 43.

The invention claimed is:

1. A ventilation device for a motor vehicle, the ventilation device comprising:
   a frame defining an opening for an air flow having an intensity and a direction relative to the frame, and
   at least one flap mounted so as to rotate relative to the frame about a pivot axis between an open position, suitable for allowing the air flow to pass, and a closed position, suitable for reducing the intensity of the air flow or changing the direction of the air flow, the flap extending along the pivot axis and having a first end and a second end that are opposite one another along the pivot axis,
   wherein:
   each of the first end and the second end is mounted so as to rotate on the frame about the pivot axis, and
   the ventilation device further comprises an intermediate support located between the first end and the second end along the pivot axis, the flap being mounted so as to rotate on the intermediate support relative to the frame about the pivot axis, the intermediate support being a separate part from the frame and attached on the frame,
   wherein the flap comprises:
   a body extending from the first end to the second end along the pivot axis, and
   a fastening portion secured to the body and forming one of a first intermediate pin and a first intermediate housing, the intermediate support forming the other of the first intermediate pin and the first intermediate housing, the first intermediate pin being located in the first intermediate housing to form a first intermediate pivot about the pivot axis between the flap and the intermediate support, the first intermediate pin and the first intermediate housing being configured to nest one in the other along the pivot axis, and
   wherein the fastening portion forms one of a second intermediate pin and a second intermediate housing, the intermediate support forming the other of the second intermediate pin and the second intermediate housing, the second intermediate pin being located in the second intermediate housing in order to form a second intermediate pivot about the pivot axis between the flap and the intermediate support, the second intermediate pin being configured to snap in the second intermediate housing along an axis perpendicular to the pivot axis,
   wherein the first intermediate housing completely surrounds the first intermediate pin about the pivot axis, and
   wherein a first end housing completely surrounds a first end pin about the pivot axis, the first end of said flap forming one of the first end pin and the first end housing, and the frame forming the other of the first end pin and the first end housing.

2. The ventilation device according to claim 1, wherein the intermediate support couples two portions of the frame along a transverse axis perpendicular to the pivot axis, the two portions being separated by the opening along the transverse axis.

3. The ventilation device according to claim 2, wherein the intermediate support is screwed or snapped on each of two portions of the frame.

4. The ventilation device according to claim 1, comprising a plurality of flaps mounted so as to rotate on the frame respectively about pivot axes between an open position, suitable for allowing the air flow to pass, and a closed position, suitable for reducing the intensity of the air flow or changing the direction of the air flow, the flaps forming a screen suitable for hiding the intermediate support for an observer located on the other side of the screen relative to the intermediate support along an axis perpendicular to the opening.

5. The ventilation device according to claim 1, wherein:
the second end forms one of a second end pin and a second end housing, the frame forming the other of the second end pin and the second end housing, the second end pin being located in the second end housing in order to form at least part of a second end pivot about the pivot axis between the flap and the frame.

6. The ventilation device according to claim 5, wherein the second end housing is configured to receive the second end pin along an axis perpendicular to the pivot axis.

7. The ventilation device according to claim 6, wherein the ventilation device comprises at least one holding part attached on the frame in order to keep the second end pin in the second end housing along said axis.

8. A method for assembling the ventilation device defined in claim 1, the method comprising:
mounting the flap on the intermediate support,
mounting the first end of the flap on the frame,
mounting the second end of the flap on the frame, and
fastening the intermediate support on the frame.

* * * * *